United States Patent [19]
Miyamoto et al.

[11] Patent Number: 5,983,037
[45] Date of Patent: Nov. 9, 1999

[54] CAMERA EQUIPPED WITH MAGNETIC RECORDING APPARATUS AND SHIELD CASE FIXING STRUCTURE

[75] Inventors: Hidenori Miyamoto, Urayasu; Hidenobu Kaji, Yokohama, both of Japan

[73] Assignee: Nikon Corporation, Tokyo, Japan

[21] Appl. No.: 09/015,288

[22] Filed: Jan. 29, 1998

[30] Foreign Application Priority Data

Jan. 31, 1997 [JP] Japan .................................... 9-018138
Dec. 8, 1997 [JP] Japan .................................... 9-337106

[51] Int. Cl.⁶ .......................... G03B 1/00; G03B 17/24; H02K 5/00
[52] U.S. Cl. .......................... 396/319; 396/418; 310/85
[58] Field of Search .................................... 396/319, 418; 310/85, 89

[56] References Cited

U.S. PATENT DOCUMENTS

| | | | |
|---|---|---|---|
| 5,128,589 | 7/1992 | Tamamura | 396/319 |
| 5,698,919 | 12/1997 | Shinoda et al. | 310/85 X |
| 5,729,782 | 3/1998 | Murakami | 396/418 |
| 5,770,905 | 6/1998 | Suzuki et al. | 310/85 |

FOREIGN PATENT DOCUMENTS

A-26832   1/1992   Japan .
A-5-34798 2/1993   Japan .

*Primary Examiner*—W. B. Perkey
*Attorney, Agent, or Firm*—Oliff & Berridge, PLC

[57] ABSTRACT

A camera equipped with a magnetic recording apparatus is provided which includes a cartridge chamber that is loaded with a film cartridge containing a magnetically recordable film, a takeup spool on which the film is wound, a drive motor that drives the takeup spool to wind up the film, a shield case that contains the drive motor, a motor mount having a fitting portion that fits on a centering member of the drive motor, and a magnetic information reading device that reads the magnetic information recorded on the film. The shield case consists of a cylindrical main body, and a bent portion formed by bending an end portion of the cylindrical main body on the side of the motor output shaft. The motor is fastened to the motor mount with at least two screws, with the bent portion sandwiched between the motor and a motor mounting surface of the motor mount. An upper surface of the fitting portion of the motor mount protrudes from the motor mounting surface of the motor mount toward the drive motor, and a clearance between the motor and the upper surface of the fitting portion is controlled to be smaller than the thickness of the bent portion of the shield case.

12 Claims, 9 Drawing Sheets

CAMERA EQUIPPED WITH MAGNETIC RECORDING APPARATUS AND SHIELD CASE FIXING STRUCTURE

INCORPORATION BY REFERENCE

The disclosure of the following priority applications are herein incorporated by reference:

Japanese Patent Application No. 9-18138 filed Jan. 31, 1997.

Japanese Patent Application No. 9-337106 filed Dec. 8, 1997.

BACKGROUND OF THE INVENTION

1. Field of the Invention

The present invention relates to a camera equipped with a magnetic recording apparatus that is capable of recording magnetic information on a magnetically recordable film, and reproducing the magnetic information recorded on the film. The present invention also relates to a fixing structure that fixes a shield case that shields a magnetic flux generated from a motor, together with the motor.

2. Discussion of the Related Art

A certain type of camera is known wherein information on photographing, such as a photographing date and an exposure value, may be recorded on a magnetic recording medium applied by coating to a photographic film with respect to each frame. The photographing information thus recorded on the film is read in at a processing laboratory, and printed out as characters on a back surface of a print, for example.

In this type of camera, the film may be transported by driving a drive motor provided inside a takeup spool. In this case, the magnetic information recorded on the film may be broken or damaged due to a leakage magnetic flux from the drive motor, or may not be reproduced due to reproduction noises caused by such a leakage flux. In view of this problem, there have been proposed (1) a camera as disclosed in Japanese laid-open Patent Publication No. 4-26832, for example, wherein a drive motor is contained in a magnetic shield case that serves to prevent a magnetic flux from leaking from the drive motor, and (2) a camera as disclosed in Japanese laid-open Patent Publication No. 5-34798 wherein a magnetic shield member formed of Permalloy or a takeup spool whose outer circumferential surface is coated with Permalloy is used, thereby to suppress or reduce magnetic noises from a motor, for example.

In the cameras (1), (2) as disclosed in the above-identified publications, however, an end face of the motor on the side of its output shaft is not shielded, and therefore influences of magnetic noises cannot be completely eliminated when a magnetic head is disposed on the side of the output shaft of the motor. Thus, it has also been proposed to provide a shield case that contains the motor and reduction gears coupled to the motor output shaft, so as to suppress magnetic noises due to a leakage flux from the end face of the motor on the side of the output shaft.

In the camera as described just above, however, the shield case and the motor are fixed in separate steps, resulting in an increased number of assembling steps and an increased cost.

SUMMARY OF THE INVENTION

The first object of the present invention is to provide a camera equipped with a magnetic recording apparatus, wherein a shield case and a motor are fastened together by means of a common fastening member.

The second object of the invention is to provide a shield case fixing structure wherein a shield case with a motor are fastened together by means of a common fastening member.

To accomplish the first object, the present invention provides a camera equipped with a magnetic recording apparatus, comprising: a cartridge chamber that is loaded with a film cartridge containing a film on which magnetic information can be recorded; a takeup spool on which the film is wound; a drive motor that drives the takeup spool to wind up the film, the drive motor having an output shaft that protrudes from one axial end thereof, and a centering member that centers the output shaft; a shield case that contains the drive motor, the shield case comprising a cylindrical main body, and a bent portion formed by bending inwards an axial end portion of the cylindrical main body on the side of the output shaft of the drive motor; a motor mount having a fitting portion which fits on the centering member of the drive motor and a motor mounting surface on which the drive motor is mounted, the motor and the motor mount being fastened to each other with at least two screws while the bent portion of the shield case is sandwiched between the motor and the motor mounting surface of the motor mount; and a magnetic information reading device that reads the magnetic information recorded on the film; wherein an upper surface of the fitting portion of the motor mount protrudes from the motor mounting surface of the motor mount toward the drive motor, and a clearance between the motor and the upper surface of the fitting portion of the motor mount is controlled to be smaller than the thickness of the bent portion of the shield case.

To accomplish the second object, the present invention provides a shield case fixing structure in which a motor having an output shaft and a shield case that shields a magnetic flux generated from the motor are mounted to a motor mount, the shield case fixing structure comprising a common fixing device that fixes the motor and the shield case to the motor mount.

DETAILED DESCRIPTION OF THE PREFERRED EMBODIMENT

A preferred embodiment of the present invention will be described in detail with reference to the drawings.

Figure 1:
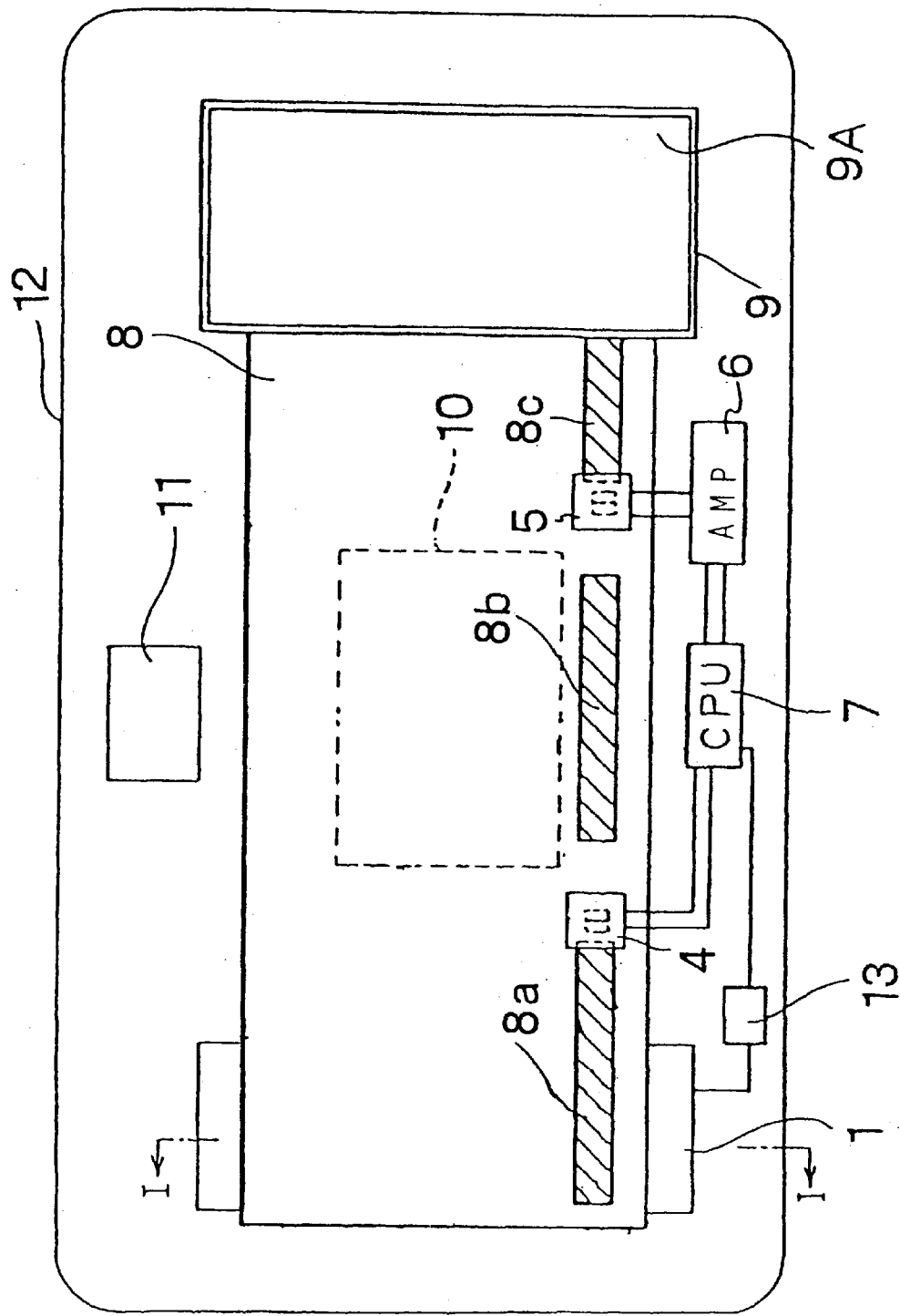
FIG. 1 is a front view of a camera according to one embodiment of the present invention.
Figure 2:
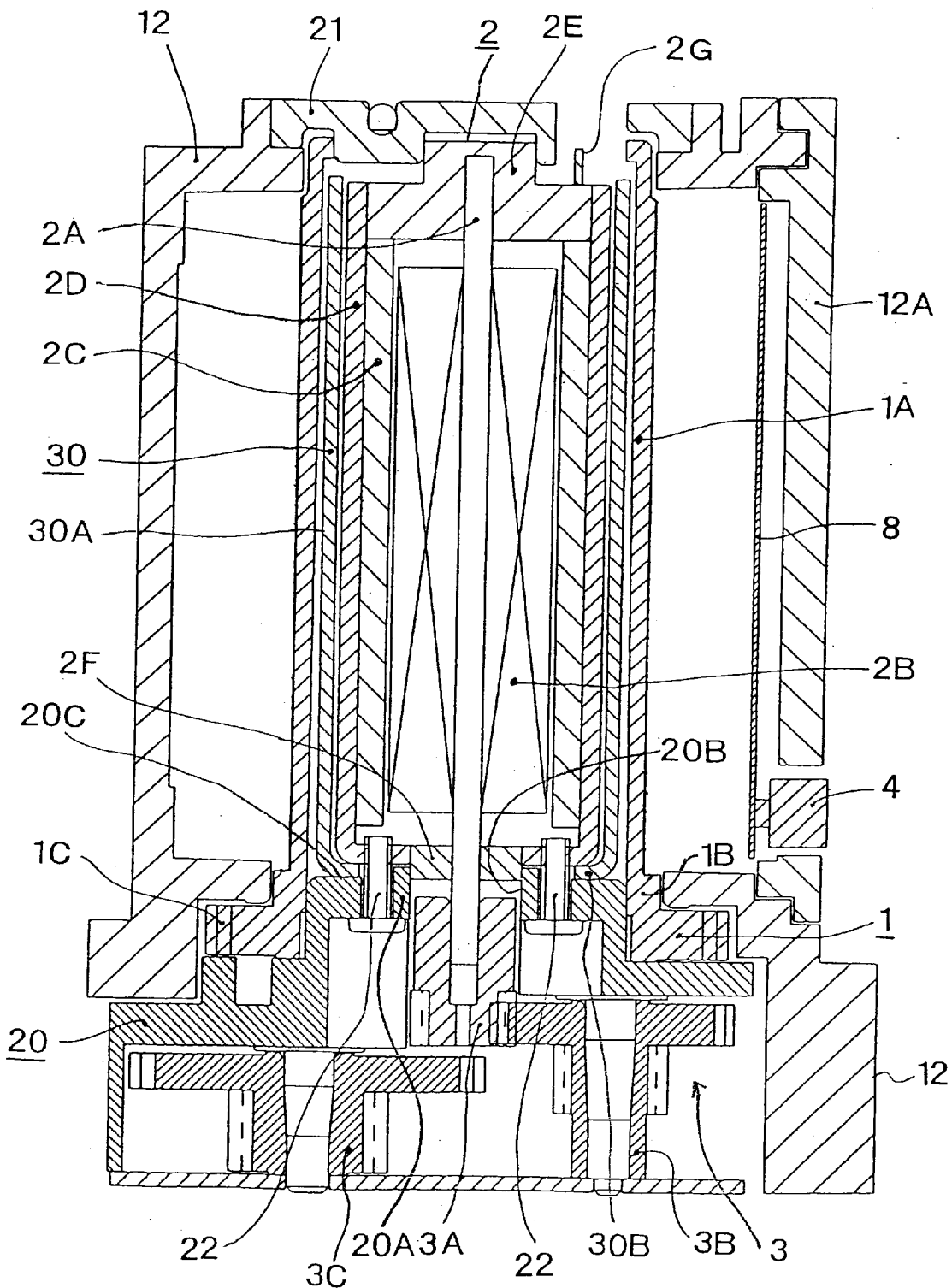
FIG. 2 is a cross-sectional view taken along line I—I, showing in detail the construction of a takeup spool of the camera of FIG. 1.
Figure 3:
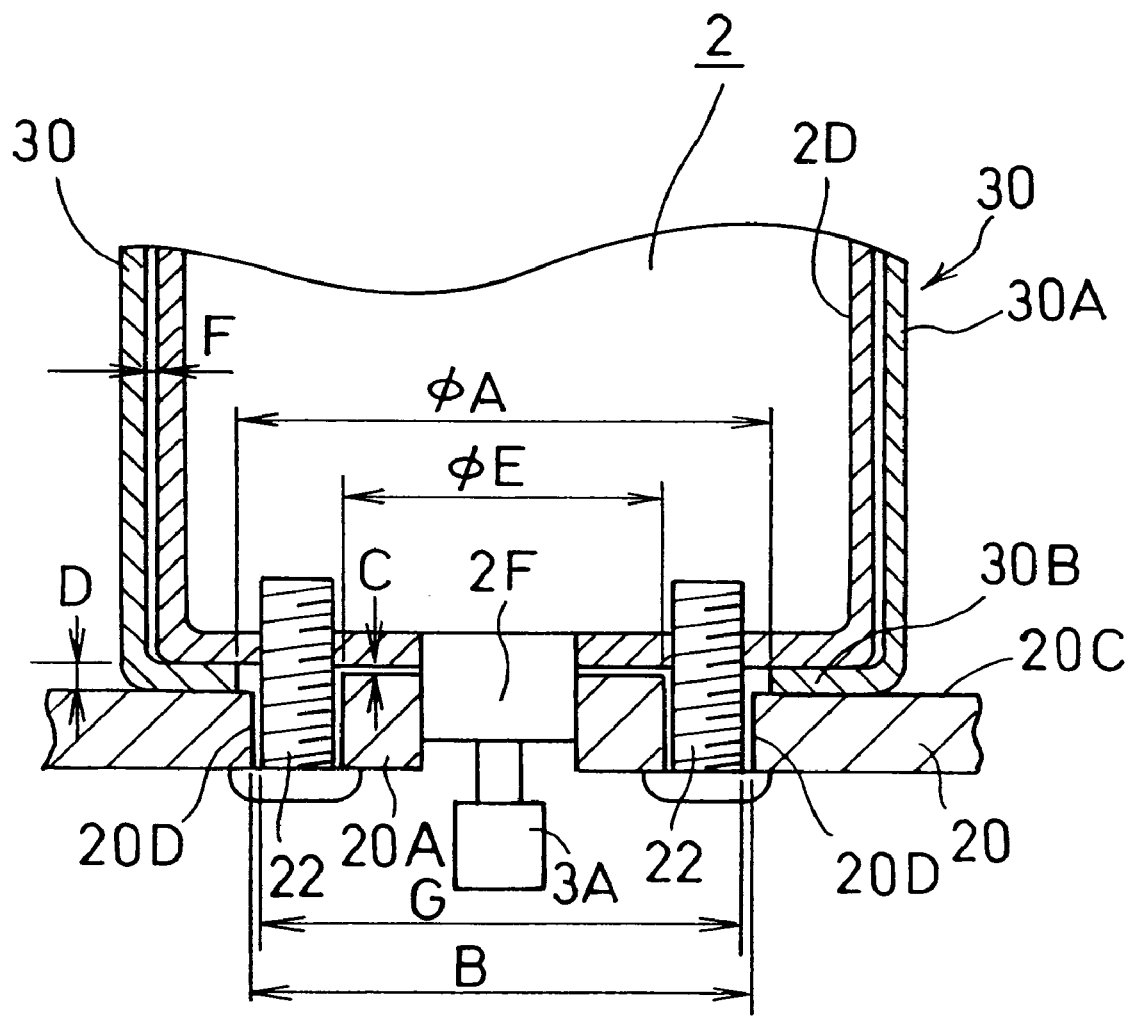
FIG. 3 is a view showing a principal part of the lower portion of the takeup spool of FIG. 2.
Figure 4:
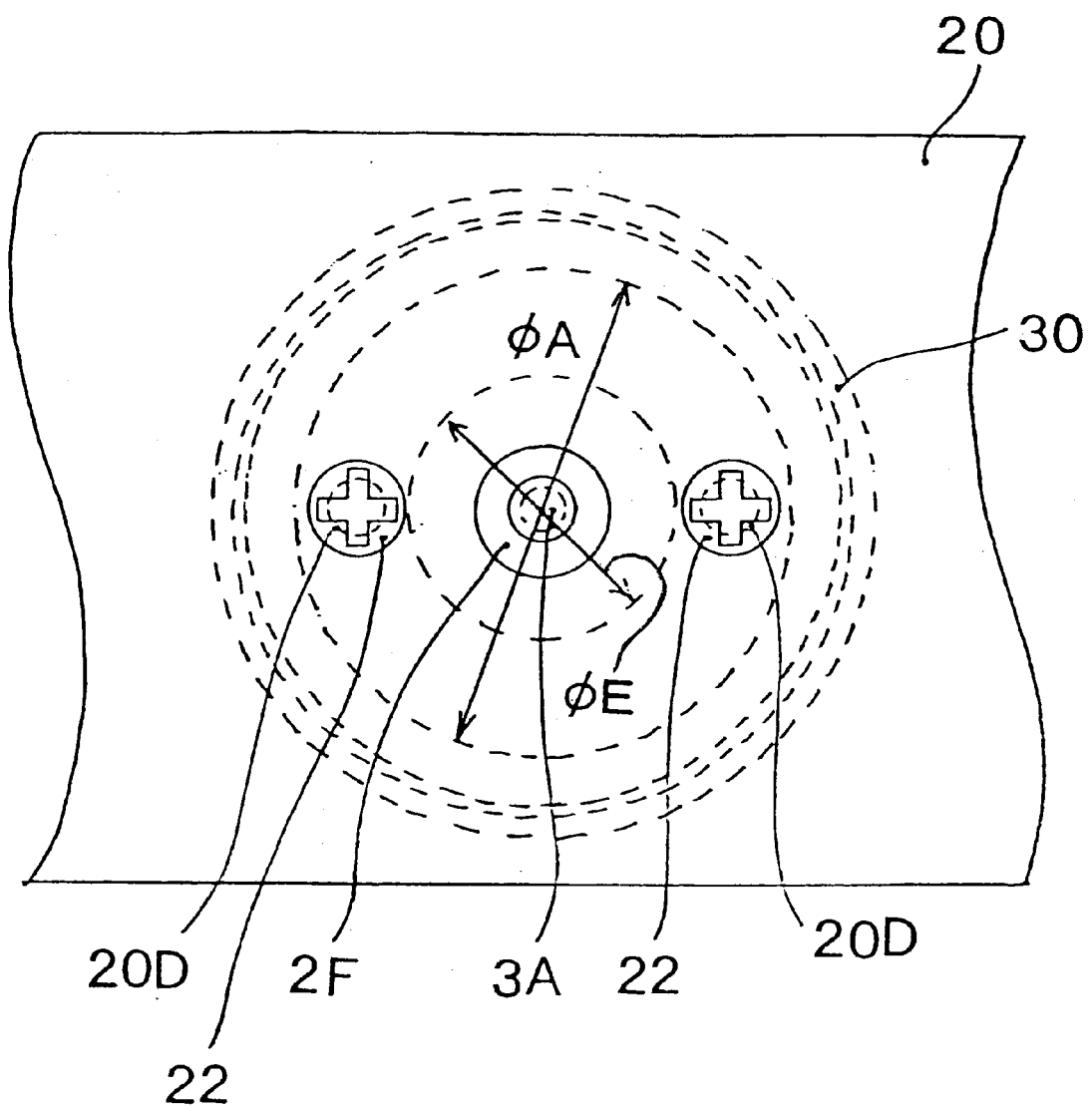
FIG. 4 is a view showing the bottom face of the takeup spool as viewed from a motor mount.

FIG. 1 is a front view showing the construction of a camera according to the present invention, and FIG. 2 is a cross sectional view taken along line I—I in FIG. 1, showing the construction of a takeup spool 1 of the camera. FIG. 3 is a view showing a principal part of the lower portion of the takeup spool 1 of FIG. 2, and FIG. 4 is a view showing the bottom face of the takeup spool 1 as viewed from the side of a motor mount.

As shown in FIG. 1, a camera body 12 incorporates a cartridge chamber 9 that is loaded with a film cartridge 9A containing a film 8, and a takeup spool 1 adapted for winding up the film 8 that has been advanced out of the film cartridge 9A. The film 8 has a film face coated with a magnetic recording medium. A screen frame 10 that defines a photographing range of the film 8 is provided between the takeup spool 1 and the cartridge chamber 9. The takeup spool 1 contains a drive motor 2 that is magnetically shielded as described later, and the film 8 is transported as the takeup spool 1 is rotated by the drive motor 2.

As shown in FIG. 1, a writing head 4 for writing magnetic information on magnetic recording areas 8a, 8b, 8c of the film 8 is provided between the takeup spool 1 and the screen frame 10, and a reading head 5 for reading magnetic information recorded on the magnetic recording areas 8a, 8b, 8c of the film 8 is provided between the cartridge chamber 9 and the screen frame 10. Amplifier 6 that serves to amplify magnetic information read by the reading head 5 is disposed below the reading head 5. CPU 7 controls the writing head 4, reading head 5 and the amplifier 6, and also controls the drive motor 2 via a motor driver 13. A viewfinder 11 is disposed above the passage of the film 8.

To ensure substantial transparency of the magnetically recordable film 8, the thickness of a magnetic substance applied by coating to the surface of the film is much smaller than that of an audio tape or video tape, and the amount of the magnetic substance used for the film is about 1/50 to 1/100 when compared to that used for the audio tape, or the like. Accordingly, the gain of the amplifier 6 is determined so that magnetic information read by the reading head 5 is amplified about 50 to 100 times.

When the takeup spool 1 is driven by rotating the drive motor 2 after photographing so as to wind up the film 8 in the camera of the present embodiment, each of the magnetic recording areas 8a–8c of the film 8 passes the writing head 4 so that the date of photographing, trimming information, and/or other information may be recorded on that area. The reading head 5, on the other hand, reproduces the magnetic information recorded on the magnetic recording areas 8a–8c during transport of the film 8, so that the reproduced information can be used for various controls.

As shown in FIG. 2, the takeup spool 1 includes a cylindrical portion 1A on which the film 8 is wound, and bearing portion 1B and gear portion 1C formed at the lower end of the cylindrical portion 1A. The motor mount 20 is fixed to the camera body 12 by a fastening means (not illustrated), and the bearing portion 1B formed at the lower end of the takeup spool 1 is rotatably supported by this motor mount 20.

The drive motor 2 is disposed inside the takeup spool 1. The motor 2 is constructed such that a motor drive shaft 2A, motor core 2B and a motor magnet 2C are contained in a motor housing 2D which also functions as a shield case, and a lid 2E is attached to the upper part of the motor housing 2D so as to fix a motor commutator and a terminal (not shown) in position. The upper end portion of the motor 2 or lid 2E is fixed to the camera body 12 by a motor fixing member 21, and the lower end of the motor 2 is fixed to the camera body 12 via the motor mount 20, as described later.

A pinion gear 3A is press-fitted on the drive shaft 2A of the drive motor 2. The pinion gear 3A is in mesh with a reduction gear 3B, which in turn engages with a gear portion 1C formed on the takeup spool 1, via a reduction gear (not shown), reduction gear 3C and another reduction gear (not shown). In operation, the film is wound onto the takeup spool 1 when the drive motor 2 is driven to rotate the takeup spool 1. A reduction gear mechanism that consists of the reduction gears 3B, 3C and others is accommodated in the motor mount 20 formed of resin. A centering member 2F is press-fitted on the drive shaft 2A of the motor 2. This centering member 2F is fitted in a fitting hole 20B of a fitting protrusion 20A formed as part of the motor mount 20, so as to center the drive shaft 2A. The motor mount 20 has a motor mounting surface 20C formed around the fitting protrusion 20A.

A cylindrical shield case 30 is disposed radially outwardly of the motor housing 2D with a slight clearance therebetween. The shield case 30 has a cylindrical main body 30A which is open at the upper end, and a bent portion 30B that is bent at the lower end of the main body 30A toward the output shaft side of the motor housing 2D. When the motor housing 2D is fastened to the motor mounting surface 20C of the motor mount 20 with screws 22, the bent portion 30B of the shield case 30 is gripped or sandwiched between the lower end face of the motor housing 2D and the motor mounting surface 20C of the motor mount 20. The shield case 30 is connected to a ground potential. (The shield case 30 is grounded.) In FIG. 2, reference numeral 12A denotes a pressure plate for closing an open portion at the back face of the camera body 12.

Referring next to FIG. 3 and FIG. 4, there will be described dimensions of respective parts of the camera equipped with the magnetic recording apparatus according to the present invention. In FIG. 3, "A" represents the inside diameter of the bent portion 30B of the shield case 30, "F" represents a clearance formed between the motor housing 2D and shield case 30 when they are positioned coaxially with each other, "E" represents the outside diameter of the fitting protrusion 20A of the motor mount 20, "B" represents the diameter of a circle that contains or encircles two screw receiving holes 20D of the motor mount 20, "G" represents the diameter of a circle that encircles two screw holes of the motor housing 2D, "C" represents a clearance between the fitting protrusion 20A of the motor mount 20 and the lower end face of the motor housing 2D, and "D" represents the thickness of the shield case 30. These dimensions "A" through "E" are determined so as to satisfy the following relationships:

$$A > B \tag{1}$$

$$A - E > 2F \tag{2}$$

$$A - G > 2F \tag{3}$$

$$D > C \tag{4}$$

With the above dimensions determined under the conditions (1), (2) and (3), even if the motor 2 is offset toward one side of the shield case 30 (with a clearance F on the one side being equal to 0) when the motor 2 is inserted into the shield case 30 and fixed to the motor mount 20, the inner circumferential edge of the bent portion 30B of the shield case 30 does not ride on the fitting protrusion 20A of the motor mount 20 nor is located inside the circle having the diameter G that encircles the screw holes formed through the lower end face of the motor, thus making it possible to fasten the motor 20 and shield case 30 with the screws 22 inserted from the lower ends of the screw receiving holes 20D.

When the above condition (3) is not satisfied, and the motor 2 is offset toward one side of the shield case 30 (with a clearance F on the one side being equal to 0), the inner circumferential edge of the bent portion 30B may advance or project into one of the screw holes formed through the lower end face of the motor, thus preventing the corresponding screw 22 from being inserted through the screw hole. In this case, however, the position of the shield case 30 may be corrected by pushing the inner circumferential edge of the bent portion 30B of the shield case 30 from the lower side of the screw receiving hole 20D to move the bent portion 30B in the lateral direction, and then the motor 20 and the shield case 30 may be fastened together with the screws 22.

With the above condition (4) satisfied, the centering member 2F and the fitting protrusion 20A are connected to each other over a sufficiently large length, and therefore the motor drive shaft 2A can be centered with improved accuracy, as compared with the case where D is equal to C (D=C). Further, the motor 2 is allowed to tilt or incline by a reduced amount.

The cylindrical portion 1A of the takeup spool 1 may be formed of a resin having a magnetic shielding effect. Also, the circumferential surface of the cylindrical portion 1A may be further covered with a magnetic shielding layer, or the lid 2E and motor fixing member 21 may be formed of a magnetic shielding resin material containing magnetic shielding fibers, so as to further improve the magnetic shielding effect.

While the film 8 is wound up or rewound by driving the motor 2 to rotate the takeup spool 1 in the illustrated embodiment, the film 8 may be rewound into the film cartridge 9A by engaging a gear train (not shown) consisting of planetary gears with the pinion gear 3A of the motor 2, thereby to rotate the motor 2 in the reverse direction.

In the illustrated embodiment, one end portion of the shield case 30 formed in a cylindrical shape is bent inwards to provide the bent portion 30B on the output shaft side of the motor housing 2D, such that the bent portion 30B is sandwiched between the motor housing 2D and the motor mount 20 with the screws 22. This arrangement is generally employed since threaded holes for screws are often formed through the end face of the motor 2 on the side of its output shaft. In the case where threaded holes for screws are formed through an end face opposite the end face on the side of the motor output shaft, the bent portion 30B of the shield case 30 may be interposed and gripped between the opposite end face and the motor mount.

Figure 5A:
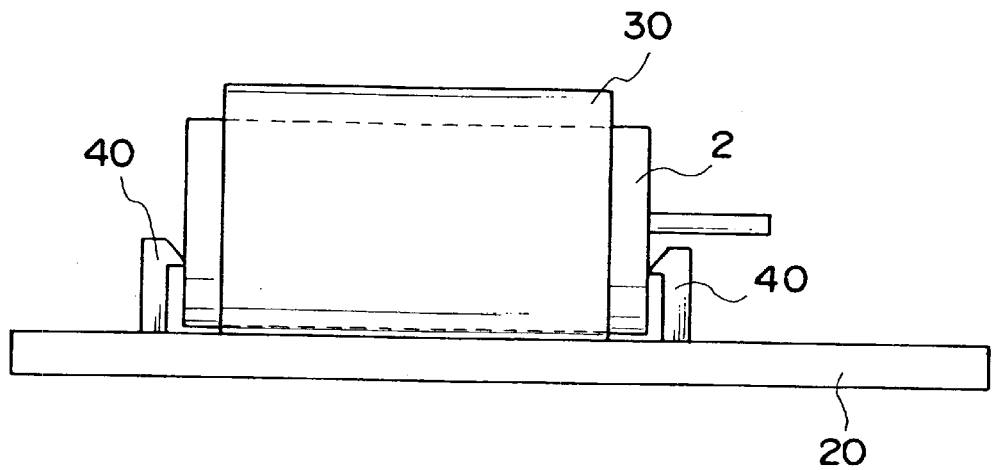
FIGS. 5A and 5B are views showing another example of fixing a shield case together with a motor.
Figure 5B:
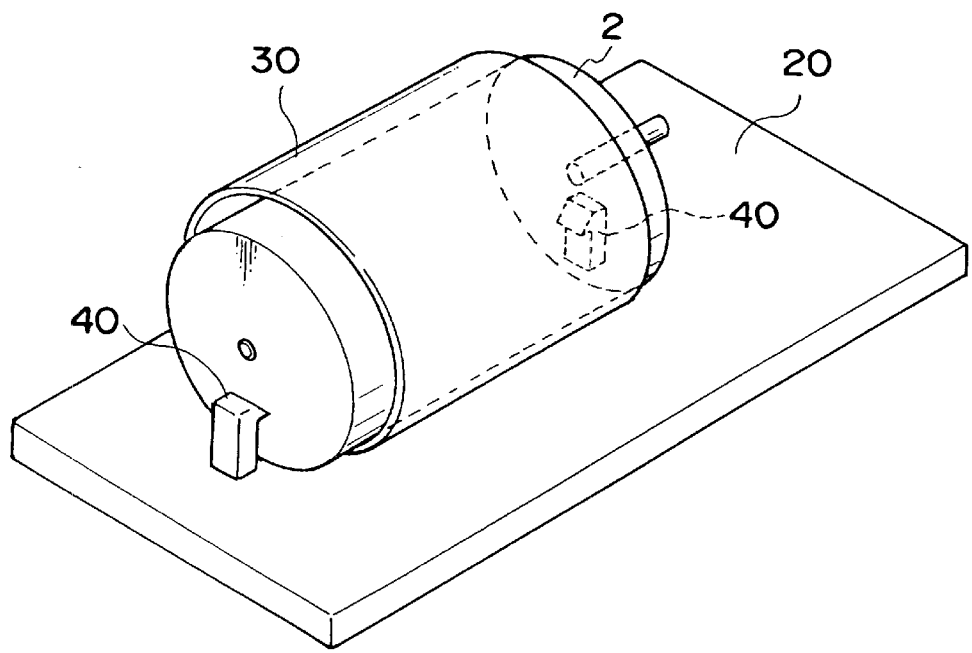

While the common screws 22 are used to fix the motor 2 and the shield case 30 in the illustrated embodiment, the motor 2 and shield case 30 may be fixed in position by common fixing means other than the screws. In the case where, as shown in Figs.5A and 5B, the motor 2 is mounted such that the end face on the side of the output shaft of the motor 2 and the opposite end face are gripped by a pair of holding arms 40 formed integrally with or separately from the motor mount 20, the shield case 30 may be fixed along with the motor 2 in the following manner. Namely, the holding arms 40 are designed to exert a fastening force in the direction toward the motor mount, so that the circumferential surface of the shield case 30 fitted on the motor 2 is pressed against the motor mount 20 due to the fastening force. In this manner, the motor 2 and the shield case 30 can be fixed to the motor mount with the common holding arms 40.

Figure 6A:
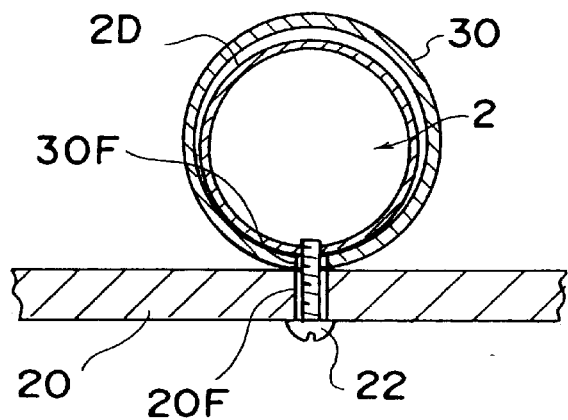
FIGS. 6A and 6B are views showing a further example of fixing a shield case together with a motor.
Figure 6B:
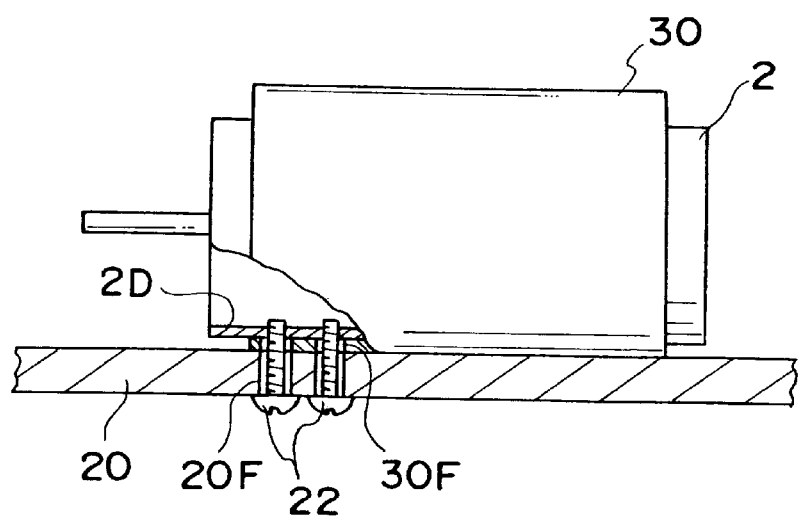
Figure 7:
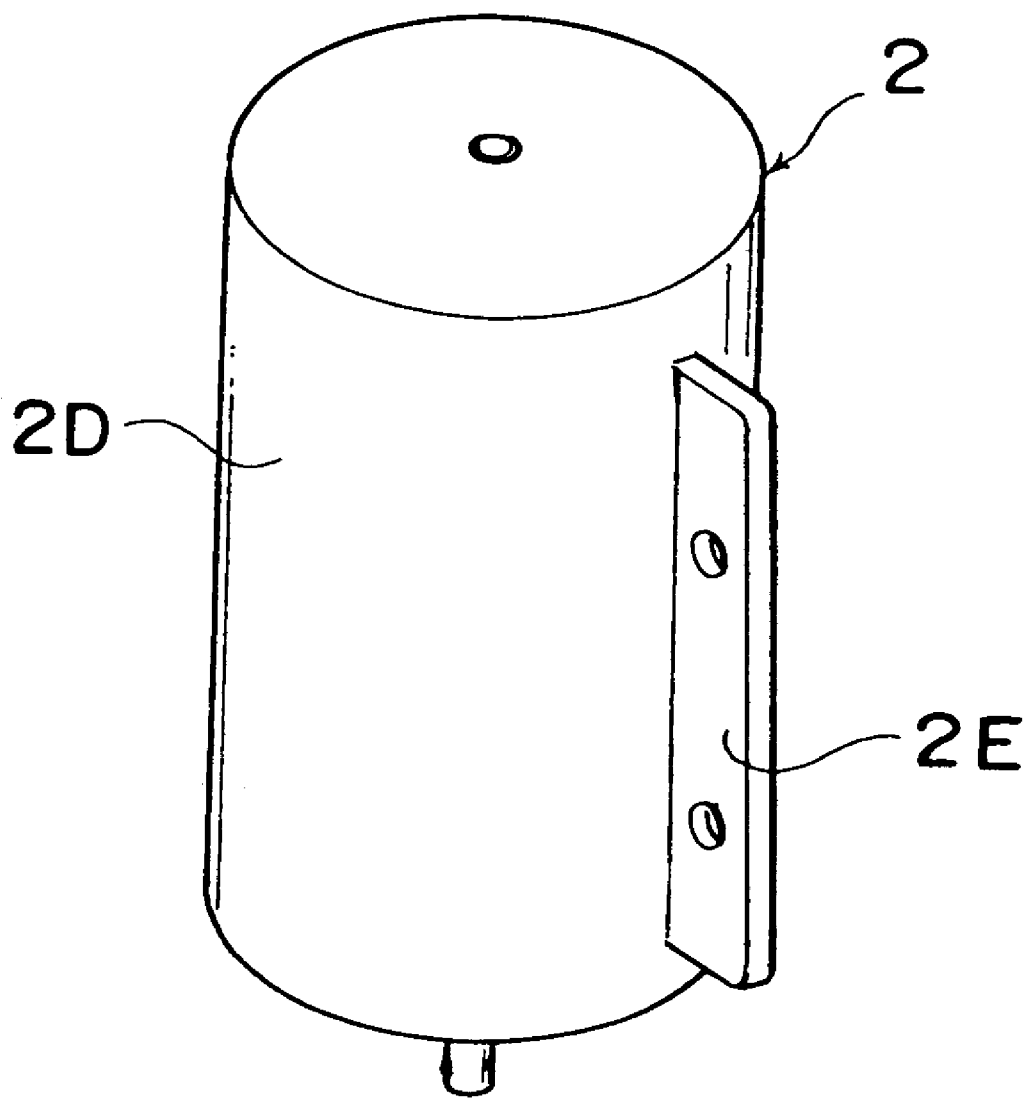
FIG. 7 is a perspective view of the motor of the example of FIG. 9.
Figure 8:
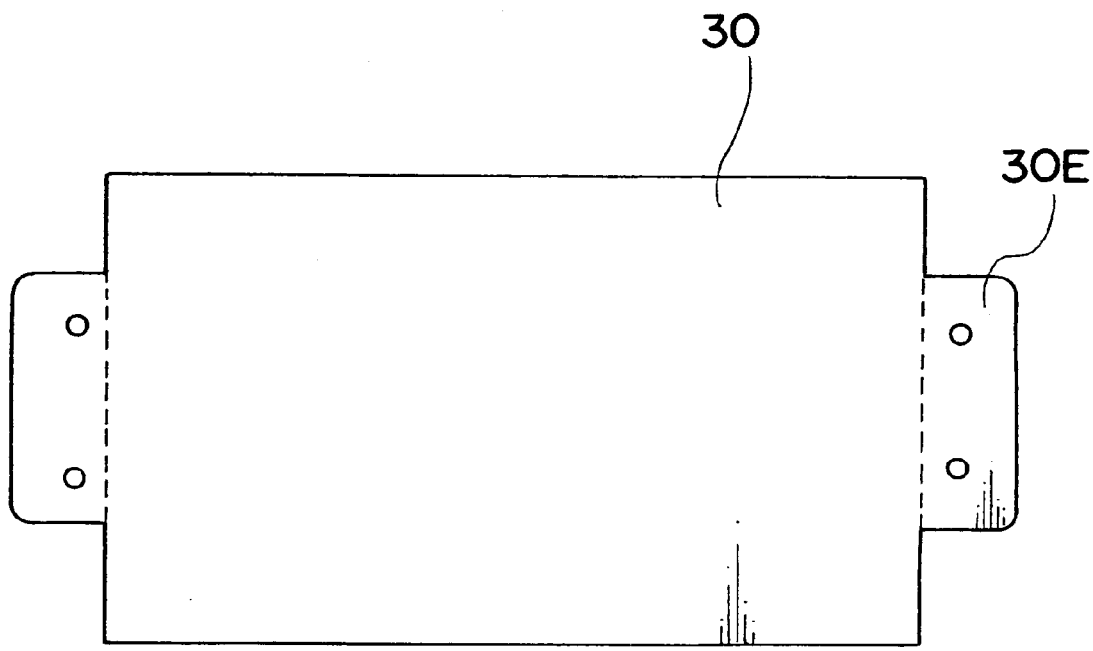
FIG. 8 is a plan view showing a shield case of the example of FIG. 9 before it is formed into a cylindrical shape.
Figure 9:
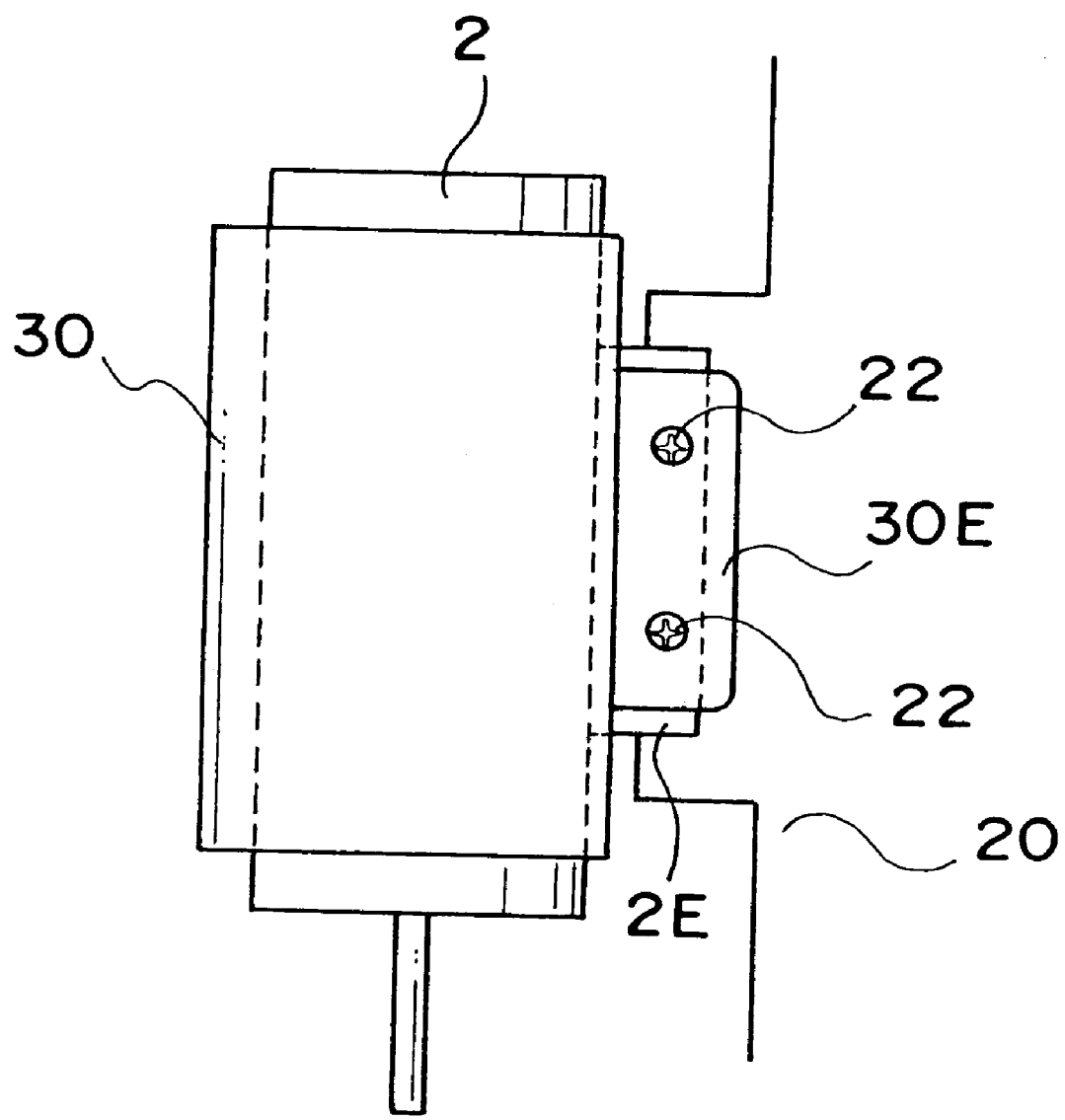
FIG. 9 is a view showing a still another example of fixing a shield case together with a motor.

As shown in FIGS. 6A and 6B, threaded holes may be formed through the circumferential surface of the motor housing 2D, and through holes 30F, 20F may be formed through the shield case 30 and motor mount 20, so that screws 22 are inserted through the through holes 20F, 30F and then screwed into the threaded holes of the motor housing 2D. In the example of FIGS. 6A and 6B, too, the motor 2 and shield case 30 can be fixed to the motor mount 20 with the common screws 22.

Where a support wing 2E for mounting the motor is formed on the housing 2D of the motor 2 to protrude in a radial direction, as shown in FIG. 7, the shield case 30 and motor 2 may be supported by common fixing means in the following manner. Namely, the shield case 30 having support wings 30E as shown in FIG. 8 is formed into a cylindrical shape, such that the support wing 2E is sandwiched between the support wings 30E of the shield case 30, and the motor 2 and shield case 30 are fastened to the motor mount 20 with common screws 22, as shown in FIG. 9. The motor 2 and shield case 30 may be fixed to the motor mount by means of common bolts and nuts.

What is claimed is:

1. A camera equipped with a magnetic recording apparatus, comprising:

a cartridge chamber that is loaded with a film cartridge containing a film on which magnetic information can be recorded;

a takeup spool on which the film is wound;

a drive motor that drives said takeup spool to wind up the film, said drive motor having an output shaft that protrudes from one axial end thereof, and a centering member that centers the output shaft;

a shield case that contains said drive motor, said shield case comprising a cylindrical main body, and a bent portion formed by bending inwards an axial end portion of the cylindrical main body on the side of the output shaft of said drive motor;

a motor mount having a fitting portion which fits on said centering member of said drive motor and a motor mounting surface on which said drive motor is mounted, said motor and said motor mount being fastened to each other with at least two screws while said bent portion of said shield case is sandwiched between said motor and said motor mounting surface of said motor mount; and a magnetic information reading device that reads the magnetic information recorded on the film;

wherein an upper surface of said fitting portion of said motor mount protrudes from said motor mounting surface of said motor mount toward said drive motor, and a clearance between said motor and said upper surface of said fitting portion of said motor mount is controlled to be smaller than a thickness of said bent portion of said shield case.

2. The camera equipped with a magnetic recording apparatus according to claim 1, wherein said bent portion of said shield case has an inside diameter that is larger than a diameter of a circle that encircles screw receiving holes of said motor mount through which said at least two screws are inserted, and wherein a difference between an outside diameter of said fitting portion that protrudes from said motor mount and an inside diameter of said bending portion of said shield case is controlled to be at least twice as large as a clearance between an outer circumferential surface of said motor and an inner circumferential surface of said shield case.

3. The camera equipped with a magnetic recording apparatus according to claim 2, wherein a difference between a diameter of a circle that encircles screw holes of said motor and the inside diameter of said bending portion of said shield case is controlled to be at least twice as large as the clearance between the outer circumferential surface of said motor and the inner circumferential surface of said shield case.

4. A shield case fixing structure in which:

a motor having an output shaft and a shield case that shields a magnetic flux generated from said motor are mounted to a motor mount; said shield case fixing structure comprising a common fixing device that fixes said motor and said shield case to said motor mount.

5. The shield case fixing structure according to claim 4, wherein said shield case is sandwiched between said motor and said motor mount.

6. The shield case fixing structure according to claim 4, wherein said fixing device comprises a screw, said motor having a threaded hole into which said screw is screwed, said shield case having a first hole through which said screw is inserted, said motor mount having a second hole through which said screw is inserted, and wherein said screw is screwed into said threaded hole through said first and second holes, such that said shield case is sandwiched between said motor and said motor mount.

7. The shield case fixing structure according to claim 5, wherein said fixing device comprises a screw, said motor having a threaded hole into which said screw is screwed, said shield case having a first hole through which said screw is inserted, said motor mount having a second hole through which said screw is inserted, and wherein said screw is screwed into said threaded hole through said first and second holes, such that said shield case is sandwiched between said motor and said motor mount.

8. The shield case fixing structure according to claim 6, wherein said threaded hole is formed in a vicinity of said output shaft of said motor, and wherein said first hole is formed at a position of said shield case that surrounds the vicinity of the output shaft of the motor.

9. The shield case fixing structure according to claim 4, wherein said fixing device comprises a screw, said shield case having an extended portion formed by bending an axial end portion thereof, said extending portion extending radially inwards from an outer circumferential surface of the shield case, and wherein said screw is inserted through a hole formed through said extended portion or through an interior of the extended portion, to be screwed into one of said motor and said motor mount, so as to fix said motor and said shield case to said motor mount.

10. The shield case fixing structure according to claim 5, wherein said fixing device comprises a screw, said shield case having an extended portion formed by bending an axial end portion thereof, said extending portion extending radially inwards from an outer circumferential surface of the shield case, and wherein said screw is inserted through a hole formed through said extended portion or through an interior of the extended portion, to be screwed into one of said motor and said motor mount, so as to fix said motor and said shield case to said motor mount.

11. The shield case fixing structure according to claim 9, wherein a threaded hole for receiving said screw is formed through one of opposite end faces of said motor, wherein said extended portion of said shield case is formed by bending said shield case along an end face of said motor on the side of the output shaft while said motor is accommodated in said shield case, and wherein said screw is screwed into said threaded hole while said extended portion of said shield case is being interposed between said motor mount and said motor.

12. The shield case fixing structure according to claim 9, wherein said motor has an extended portion that protrudes radially outwards from a circumferential surface thereof, wherein said extended portion of said shield case protrudes in a radial direction while said motor is accommodated in said shield case, and wherein said motor and said shield case are fixed to said motor mount by means of said screw while the extended portion of the motor and the extended portion of the shield case are being touched to each other.

\* \* \* \* \*